Sept. 29, 1925.
Re. 16,177
L. IVERSEN
ROLLING MILL
Original Filed Nov. 22, 1920
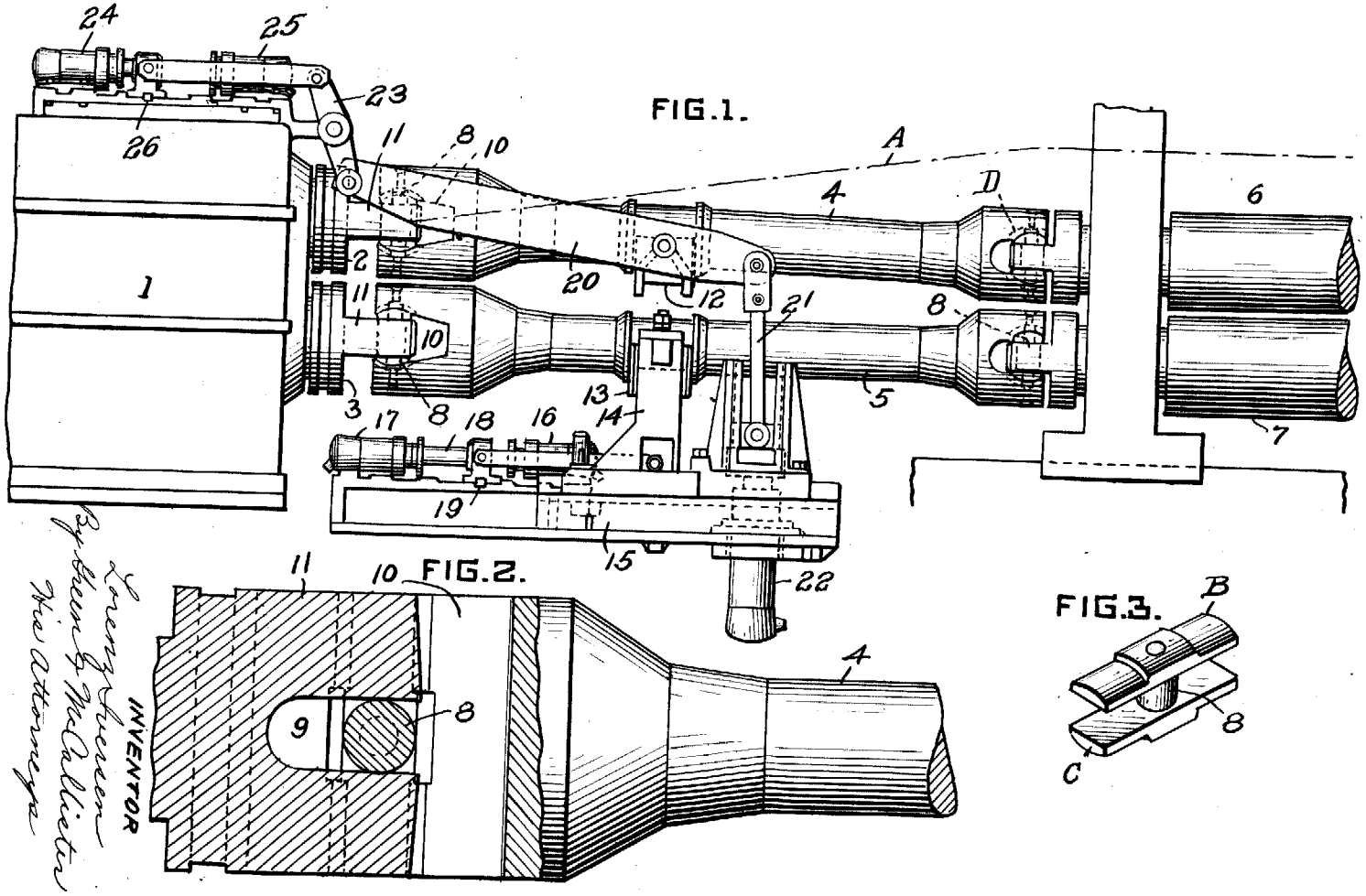
INVENTOR
Lorenz Iversen
By Green & McCallister
His Attorneys Reissued Sept. 29, 1925. Re. 16,177

UNITED STATES PATENT OFFICE.

LORENZ IVERSEN, OF PITTSBURGH, PENNSYLVANIA, ASSIGNOR TO MESTA MACHINE COMPANY, OF WEST HOMESTEAD, PENNSYLVANIA, A CORPORATION OF PENNSYLVANIA.

ROLLING MILL.

Original No. 1,496,463, dated June 3, 1924, Serial No. 425,636, filed November 22, 1920. Application for reissue filed January 30, 1925. Serial No. 5,907.

*To all whom it may concern:*

Be it known that I, LORENZ IVERSEN, a citizen of the United States, and a resident of Pittsburgh, in the county of Allegheny and State of Pennsylvania, have made a new and useful invention in Rolling Mills, of which the following is a specification.

My invention relates to rolling mills and more particularly to an improved connection between the mill spindles and their rolls and driving pinions of such construction as to render the assembling and disassembling thereof easy and rapid.

The main object of my invention is to decrease the time required to change the rolls. As such time is entirely non-productive, it is important that the operation be as short and simple as possible.

Another object is to provide a rolling mill having means for assembling and disassembling the driving spindles from the associated rolls without the necessity of first unfastening a connection or removing any part or parts thereof.

In my previous Patent No. 1,359,601, granted November 23, 1920, I illustrate and claim a universal coupling including a novel coupling unit utilized in the mechanism illustrated in the accompanying drawings, in which Figure 1 is an elevation of a mill equipped with my invention, Fig. 2 is a horizontal section through the joint between one of the spindles and its respective pinion and is drawn on an enlarged scale and Fig. 3 is an isometric view of a detail of the universal coupling set forth and claimed in my aforementioned patent.

The mill driving pinions are enclosed in a housing 1 from which the pinion necks 2 and 3 extend and, by means of spindles 4 and 5, are connected to their respective rolls 6 and 7.

The requisite universal joint between each spindle and the pinion or roll includes a tongue on the pinion or roll, a recess in the spindle adapted to receive the tongue and a coupling unit for pivotally securing the tongue in the groove to prevent relative transverse movement and the resulting disassembly of the spindle and pinion or roll. This unit, as more fully described in the above-mentioned patent, includes a pin element 8 which extends across the spindle recess and is received in a slot 9 in the tongue member.

As shown in Fig. 3, the pin 8 is rigidly secured to two opposed segmental members B and C. The unit is mounted in a segmental cylindrical recess D, as shown in Fig. 1, so that it is capable of turning to accommodate itself to the misalignment of the spindle and the pinion or roll.

In the joint between the pinion and spindle, the recesses 10 extend inwardly some distance beyond the coupling unit. Similarly, the shoulders of the tongues 11 on pinions 2 and 3 are cut back some distance from the ends of their respective spindles. This construction enables each spindle to be moved towards its pinion far enough to entirely separate the opposite end of the spindle from its respective roll permitting the latter to be removed and replaced by another roll which, in turn, may be connected to the spindle by merely shifting the latter to the right.

It will be understood that the enlarged recess and elongated tongue may be located at either end of the spindle or at both ends, also that the tongue may be located on the spindle and the recess on the adjacent element, but the construction and relative positions shown are preferred.

The above-described arrangement of the couplings avoids the lifting or transportation of the spindles whenever the rolls are changed and results in a material saving of time.

To shift the spindles to and fro as described and to relieve the roll and pinion bearings of the weight of the spindles are the functions of the movable bearings 12 and 13 and their associated mechanism.

The lower spindle 5 is supported at 13 by a bearing, the stand 14 of which is slidably mounted on a base plate 15. Hydraulic cylinders are indicated at 16 and 17 and their common piston stem 18 is linked to the bearing stand 14 so that, by admission of fluid to the proper cylinder, the stand, bearing and spindle are shifted as desired. A key 19 locks the bearing stand in the position indicated to avoid undesired shifting of the spindle during operation of the mill.

The upper spindle bearing 12 is mounted on a lever 20 pivotally supported by a pitman 21, mounted on the piston rod of a hydraulic cylinder 22, and by a link 23 fulcrumed on housing 1 and adapted to be operated by hydraulic cylinders 24 and 25. Admission of fluid to one of the latter cylinders will shift the upper spindle 4 without depriving it of its bearing support as the fluid pressure in cylinder 22 is maintained so as to accommodate the resulting displacement of the piston. The pressure in the cylinder 22 also accommodates variations in the position of spindle 4 in the vertical plane of its axis, for instance when moved to the position indicated by the dot-and-dash line A.

Key 26 locks spindle 4 against longitudinal shifting without affecting the operation of the vertical adjustment.

It is obvious that, by use of the shifting mechanism described, the handling of the spindles is rendered a matter of seconds and may be controlled by one man.

While I have illustrated hydraulic operating and supporting mechanism, I contemplate the substitution of effective equivalents for the cylinders and pistons shown.

Having described my invention and illustrated its preferred construction, I claim:

1. In a rolling mill, a driving member, a roll member, a spindle connecting said members, a coupling between each end of said spindle and the adjacent member, forming a universal joint therebetween and adapted to permit axial movement of said spindle toward one of said members to disengage said spindle from said other member and means for so moving said spindle.

2. In a rolling mill, a driving member, a roll, a spindle member connecting said roll and said driving member, a coupling unit mounted in one of said members, a tongue on the other of said members engaging said unit so as to form a universal joint and a recess in the member containing said unit adapted to permit relative axial movement between said members to separate said spindle from said roll.

3. In a rolling mill, a driving member, a roll member, an axially movable spindle connecting said members, a bearing for supporting said spindle in operative relation to said members and means for moving said spindle so as to disconnect it from one of said members.

4. In a rolling mill, a driving member, a roll member, a movable spindle connecting said members, means for shifting said spindle so as to disconnect it from one of said members, and means for supporting said spindle in its operative position and in its shifted or disconnected position.

5. In a rolling mill, a driving member, a roll member, a spindle connecting said members, a support for normally maintaining said spindle in operative relation to said members and means for moving said support so as to shift said spindle and disconnect it from one of said members.

6. In a rolling mill, a driving member, a roll member, a movable spindle normally operatively connecting said members, means for supporting said member, and means for moving said support means to disconnect said spindle from one of said members while supporting said spindle.

7. The combination in a rolling mill having a plurality of roll members, of a driving member for each of said roll members, a spindle adapted to connect each driving member with the associated roll member, a bearing for each spindle adapted to normally support said spindle in operative relation to the associated members and means for moving each bearing so as to shift the spindle supported thereby and disconnect it from one of said members.

8. The combination in a rolling mill having a plurality of roll members, of a driving member for each of said roll members, a spindle adapted to connect each driving member with the associated roll member, a bearing for each spindle adapted to normally support said spindle in operative relation to the associated members, means for moving each bearing so as to shift the spindle supported thereby and disconnect it from one of said members and means for supporting one of said bearings at different elevations.

9. In a rolling mill, a driving member, a roll member, a spindle connecting said members and having a universal coupling to each of said members adapted to permit axial movement of said spindle, a spindle carrier bearing and means for moving said bearing so as to shift said spindle axially to separate it from one of said members.

10. In a rolling mill, a vertically movable roll driving spindle adapted to be shifted axially so as to disconnect it from the associated roll, a bearing for said spindle mounted upon a supporting lever, a floating support for one end of said lever, a horizontally movable support for the other end of said lever and means for moving said lever so as to shift said spindle axially.

11. In a rolling mill, a roll driving spindle, a bearing for supporting said spindle, a fluid pressure operated plunger connected to said bearing and means for operating said plunger so as to move said bearing and shift said spindle axially.

12. In a rolling mill, a spindle, a slidably mounted spindle bearing, two horizontally mounted opposed hydraulic cylinders, a double ended plunger operated by said cylinders, and means for moving said spindle bearing by said plunger for the purpose of shifting said spindle.

13. In a rolling mill, a spindle adapted to be shifted axially to disconnect it from the associated roll and to move in a vertical plane to accommodate vertical movement of said roll, a bearing for said spindle, means for shifting said bearing axially of said roll and means for automatically adjusting the vertical position of said bearing to accommodate vertical movements of said spindle.

14. In a rolling mill, a spindle adapted to be shifted axially to disconnect it from its roll and to be moved vertically, a bearing for said spindle mounted upon a horizontal lever, a fluid pressure support for one end of said lever, and a horizontally movable pivotal support for the other end of said lever, and means for positively actuating said pivotal support.

In testimony whereof, I have hereunto set my hand this 26th day of January, 1925.

LORENZ IVERSEN.

Certificate of Correction.

It is hereby certified that in Reissue Letters Patent No. 16,177, granted September 29, 1925, upon the application of Lorenz Iversen, of Pittsburgh, Pennsylvania, for an improvement in "Rolling Mills," an error appears in the printed specification requiring correction as follows: Page 2, line 72, claim 6, for the word "member" read *spindle;* and that the said Letters Patent should be read with this correction therein that the same may conform to the record of the case in the Patent Office.

Signed and sealed this 27th day of October, A. D. 1925.

[SEAL.]

KARL FENNING,
*Acting Commissioner of Patents.*